US012742420B2

(12) United States Patent
Clark et al.

(10) Patent No.: US 12,742,420 B2
(45) Date of Patent: Sep. 22, 2026

(54) AIRCRAFT PROPULSION SYSTEM WITH SHIELDED ELECTRIC MACHINE

(71) Applicant: RTX Corporation, Farmington, CT (US)

(72) Inventors: Thomas E Clark, Wells, ME (US); Murat Yazici, Glastonbury, CT (US); Jung Muk Choe, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/066,288

(22) Filed: Feb. 28, 2025

(65) Prior Publication Data

US 2026/0258755 A1 Sep. 3, 2026

(51) Int. Cl.
*F02C 7/24* (2006.01)
*F01D 15/10* (2006.01)
*F02C 6/00* (2006.01)

(52) U.S. Cl.
CPC ................ *F02C 7/24* (2013.01); *F01D 15/10* (2013.01); *F02C 6/00* (2013.01); *F05D 2220/76* (2013.01)

(58) Field of Classification Search
None
See application file for complete search history.

(56) References Cited

U.S. PATENT DOCUMENTS 11,603,800 B2 3/2023 Lacko
11,691,742 B1 * 7/2023 Mark ........................ F02C 7/36 60/698
12,152,538 B2 11/2024 Charier
2018/0050807 A1 2/2018 Kupiszewski
2018/0051702 A1 2/2018 Kupiszewski
2022/0255396 A1 * 8/2022 Pazinski ................... F02K 5/00
2023/0216367 A1 * 7/2023 Rohoza .................. H02K 11/33 310/172

FOREIGN PATENT DOCUMENTS

WO 2023111433 A1 6/2023

OTHER PUBLICATIONS

EP Search Report for EP Patent Application No. 26161735.1 dated Jun. 23, 2026.

* cited by examiner

*Primary Examiner* — Phutthiwat Wongwian
*Assistant Examiner* — Jacek Lisowski
(74) *Attorney, Agent, or Firm* — Getz Balich LLC

(57) ABSTRACT

An assembly is provided for an aircraft powerplant. This assembly includes an engine case, an engine core, an electric machine and a shield. The engine core is housed within the engine case. The engine core includes a compressor section, a combustor section and a turbine section. The electric machine is disposed outboard of and mounted with the engine case. The electric machine includes an electric machine rotor, an electric machine stator and an electric machine case. The electric machine rotor is housed within the electric machine case and is rotatable about an axis. The electric machine stator is housed within the electric machine case and is next to the electric machine rotor. The shield is disposed between the electric machine case and the engine case. The shield extends axially along and partially circumferentially about the electric machine.

17 Claims, 8 Drawing Sheets

AIRCRAFT PROPULSION SYSTEM WITH SHIELDED ELECTRIC MACHINE

BACKGROUND OF THE DISCLOSURE

1. Technical Field

This disclosure relates generally to an aircraft and, more particularly, to an electric machine system for the aircraft.

2. Background Information

An aircraft propulsion system may include one or more electric machines. Various electric machine systems are known in the art. While these known electric machine systems have various benefits, there is still room in the art for improvement.

SUMMARY OF THE DISCLOSURE

According to an aspect of the present disclosure, an assembly is provided for an aircraft powerplant. This assembly includes an engine case, an engine core, an electric machine and a shield. The engine core is housed within the engine case. The engine core includes a compressor section, a combustor section and a turbine section. The electric machine is disposed outboard of and mounted with the engine case. The electric machine includes an electric machine rotor, an electric machine stator and an electric machine case. The electric machine rotor is housed within the electric machine case and is rotatable about an axis. The electric machine stator is housed within the electric machine case and is next to the electric machine rotor. The shield is disposed between the electric machine case and the engine case. The shield extends axially along and partially circumferentially about the electric machine.

According to another aspect of the present disclosure, an assembly is provided for an aircraft propulsion system. This assembly includes a housing structure, a propulsor rotor, an engine core, an electric machine and a shield. The housing structure includes an inner housing structure and an outer housing structure that is disposed radially outboard of the inner housing structure. The inner housing structure includes an engine case and a nacelle structure that at least partially covers the engine case. The propulsor rotor is housed within the outer housing structure. The engine core is configured to drive rotation of the propulsor rotor. The engine core is housed within the engine case. The engine core includes a compressor section, a combustor section and a turbine section. The electric machine is disposed in a compartment between the engine case and the nacelle structure. The shield is disposed between the electric machine and the engine case. The shield is configured to: shield the electric machine from heat energy generated by the engine core; and/or shield a powerplant component mounted with the engine case from electromagnetic energy generated by the electric machine.

According to still another aspect of the present disclosure, another assembly is provided for an aircraft powerplant. This assembly includes a gearbox, an electric machine and a shield. The electric machine is mounted to and operably coupled to the gearbox. The electric machine is configurable as: an electric motor during a motor mode of operation; and/or an electric generator during a generator mode of operation. The shield includes a channel, a sidewall and an endwall. The electric machine is disposed in the channel. The sidewall extends partially circumferentially about the electric machine between opposing sides of an opening into the channel. The sidewall extends axially along the electric machine to the endwall. The shield is constructed from non-ferrous metal and/or dielectric material.

The shield may be configured to shield the electric machine from heat energy generated by the engine core.

The assembly may also include a powerplant component. The shield may be disposed between the electric machine and the powerplant component. The shield may be configured to shield the powerplant component from electromagnetic energy generated by the electric machine.

The powerplant component may be a component of an electrical system.

The powerplant component may be a component of a lubrication system.

The powerplant component may be a component of a fuel system.

A wall of the shield may be configured from or otherwise include non-ferrous metal and/or dielectric material.

A wall of the shield may include a first layer and a second layer overlapping the first layer. The first layer may be configured from or otherwise include non-ferrous metal. The second layer may be configured from or otherwise include dielectric material.

The second layer may axially and circumferentially overlap the first layer.

The second layer may radially and circumferentially overlap the first layer.

The second layer may engage and/or may be attached to the first layer.

The second layer may be spaced from the first layer by an air gap.

The wall of the shield may also include a third layer overlapping the second layer. The second layer may be between the first layer and the third layer. The third layer may be configured from or otherwise include a non-ferrous metal.

The second layer may be between the first layer and the electric machine.

The shield may include a sidewall and an endwall. The sidewall may extend axially along the electric machine to the endwall. The sidewall may extend partially circumferentially about the electric machine between opposing circumferential ends of the shield.

The electric machine may be disposed in a channel of the shield. An opening into the channel may face away from the engine core.

The assembly may also include a rotating structure operatively coupled to the electric machine rotor. The rotating structure may include a bladed rotor in the compressor section or the turbine section.

The electric machine may be configurable as: an electric motor during a motor mode of operation; and/or an electric generator during a generator mode of operation.

The assembly may also include a ducted propulsor rotor and a rotating structure. The rotating structure may be operatively coupled to and configured to drive rotation of the ducted propulsor rotor. The rotating structure may include a turbine rotor disposed in the turbine section.

The assembly may also include an open propulsor rotor and a rotating structure. The rotating structure may be operatively coupled to and configured to drive rotation of the open propulsor rotor. The rotating structure may include a turbine rotor disposed in the turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
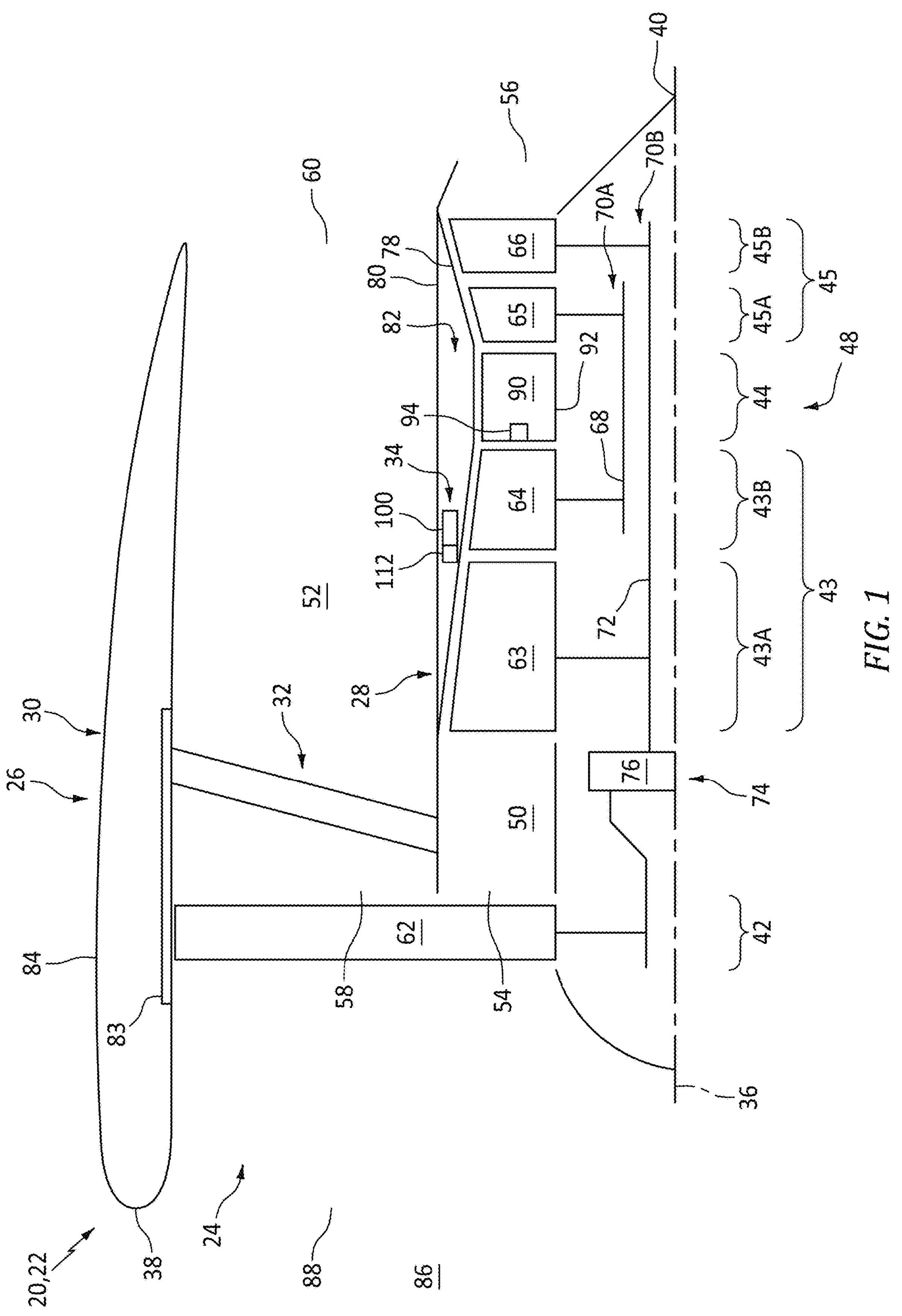
FIG. 1 is a partial schematic illustration of an aircraft propulsion system with a ducted propulsor rotor.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see also FIG. 2). The aircraft propulsion system 22 extends axially along an axis 36 between an axial upstream, forward end 38 of the aircraft propulsion system 22 and an axial downstream, aft end 40 of the aircraft propulsion system 22. Briefly, the propulsion system axis 36 may be a centerline axis of the aircraft propulsion system 22, the turbine engine 24 and/or one or more of its members. The propulsion system axis 36 may also or alternatively be a rotational axis for one or more members of the turbine engine 24.

The aircraft propulsion system 22 and its turbine engine 24 of FIG. 1 include a propulsor section 42 (e.g., a fan section), a compressor section 43, a combustor section 44 and a turbine section 45. The compressor section 43 of FIG. 1 includes a low pressure compressor (LPC) section 43A and a high pressure compressor (HPC) section 43B. The turbine section 45 of FIG. 1 includes a high pressure turbine (HPT) section 45A and a low pressure turbine (LPT) section 45B. At least (or only) the LPC section 43A, the HPC section 43B, the combustor section 44, the HPT section 45A and the LPT section 45B collectively form a core 48 (e.g., a gas generator) of the turbine engine 24. The aircraft propulsion system 22 and its turbine engine 24 of FIG. 1 also include a core flowpath 50 (e.g., an annular core flowpath) and a bypass flowpath 52 (e.g., an annular bypass flowpath). The core flowpath 50 extends sequentially through the LPC section 43A, the HPC section 43B, the combustor section 44, the HPT section 45A and the LPT section 45B from an airflow inlet 54 into the core flowpath 50 to a combustion products exhaust 56 out from the core flowpath 50. The bypass flowpath 52 extends through a bypass duct from an airflow inlet 58 into the bypass flowpath 52 to an airflow exhaust 60 from the bypass flowpath 52, where the bypass duct may be formed by the inner housing structure 28 and the outer housing structure 30. The bypass flowpath 52 and its bypass duct are configured to bypass (e.g., are disposed radially outboard of and extend along) the engine core 48 and the inner housing structure 28.

The propulsor section 42, the LPC section 43A, the HPC section 43B, the combustor section 44, the HPT section 45A and the LPT section 45B may be arranged sequentially along the propulsion system axis 36 within the propulsion system housing 26. The propulsor section 42 includes a bladed propulsor rotor 62; e.g., a fan rotor. The LPC section 43A includes a bladed low pressure compressor (LPC) rotor 63. The HPC section 43B includes a bladed high pressure compressor (HPC) rotor 64. The HPT section 45A includes a bladed high pressure turbine (HPT) rotor 65. The LPT section 45B includes a bladed low pressure turbine (LPT) rotor 66. Each of these engine rotors 62-66 includes a rotor base (e.g., a disk or a hub) and a plurality of rotor blades (e.g., airfoils, vanes, etc.). The rotor blades may be arranged into one or more stages axially along the respective engine rotor 62-66. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 64 is coupled to and rotatable with the HPT rotor 65. The HPC rotor 64 of FIG. 1, for example, is connected to the HPT rotor 65 through a high speed shaft 68. At least (or only) the HPC rotor 64, the HPT rotor 65 and the high speed shaft 68 collectively form a high speed rotating structure 70A; e.g., a high speed spool of the turbine engine 24 and its engine core 48. This high speed rotating structure 70A of FIG. 1 and its members 64, 65 and 68 are rotatable about the propulsion system axis 36. However, it is contemplated the high speed rotating structure 70A may alternatively be rotatable about another axis radially and/or angularly offset from the rotational axis of the propulsor rotor 62 and/or the centerline axis of the turbine engine 24.

The LPC rotor 63 is coupled to and rotatable with the LPT rotor 66. The LPC rotor 63 of FIG. 1, for example, is connected to the LPT rotor 66 through a low speed shaft 72. At least (or only) the LPC rotor 63, the LPT rotor 66 and the low speed shaft 72 collectively form a low speed rotating structure 70B; e.g., a low speed spool of the turbine engine 24 and its engine core 48. This low speed rotating structure 70B of FIG. 1 and its members 63, 66 and 72 are rotatable about the propulsion system axis 36. However, it is contemplated the low speed rotating structure 70B may alternatively be rotatable about another axis radially and/or angularly offset from the rotational axis of the propulsor rotor 62 and/or the centerline axis of the turbine engine 24.

The low speed rotating structure 70B is coupled to the propulsor rotor 62 through a propulsor drivetrain 74. The propulsor drivetrain 74 may be configured as a geared drivetrain, where a geartrain 76 (e.g., a transmission, a speed change device, an epicyclic geartrain, etc.) is disposed between and operatively couples the propulsor rotor 62 to the low speed rotating structure 70B and its LPT rotor 66. With this arrangement, the propulsor rotor 62 may rotate at a different (e.g., slower) rotational speed than the low speed rotating structure 70B and its LPT rotor 66. Here, the propulsor rotor 62 and the low speed rotating structure 70B may rotate in a common (the same) direction about the propulsion system axis 36 or in opposite directions about the propulsion system axis 36 depending, for example, upon the specific configuration of the geartrain 76. Alternatively, the propulsor drivetrain 74 may be configured as a direct-drive drivetrain, where the geartrain 76 is omitted. With such an arrangement, the propulsor rotor 62 rotates at a common (the same) rotational speed as the low speed rotating structure 70B and its LPT rotor 66.

The inner housing structure 28 of FIG. 1 includes an inner case 78 (e.g., a core case) for the turbine engine 24, an inner nacelle structure 80 (sometimes referred to as an inner fixed structure (IFS)) and an internal inner housing compartment 82 (e.g., an engine core compartment). The inner case 78 is disposed radially outboard of, extends axially along and may circumscribe one or more or all of the engine sections 43A-45B and the engine rotors 63-66. The inner case 78 may thereby house and provide a support structure for the respective engine sections 43A-45B and the engine rotors 63-66. The inner nacelle structure 80 is configured to provide an aerodynamic cover over the engine core 48 and its inner case 78. At least (or only) the inner housing structure 28 and its inner nacelle structure 80 may collectively form a radial inner peripheral boundary of the bypass flowpath 52. The inner housing compartment 82 of FIG. 1 is formed by and is disposed radially between the inner case 78 and an inner barrel of the inner nacelle structure 80.

The outer housing structure 30 of FIG. 1 includes an outer case 83 (e.g., a fan case) for the turbine engine 24 and an outer nacelle structure 84. The outer case 83 is disposed radially outboard of, extends axially along and may circumscribe the propulsor section 42 and its propulsor rotor 62. The outer case 83 may thereby house and may be configured as a containment structure for the propulsor section 42 and its propulsor rotor 62. The outer nacelle structure 84 is configured to provide an aerodynamic cover over the outer case 83. At least (or only) the outer housing structure 30 and its outer nacelle structure 84 may collectively form a radial outer peripheral boundary of the bypass flowpath 52.

During operation of the aircraft propulsion system 22 of FIG. 1, ambient air from an environment 86 external to the aircraft and its aircraft propulsion system 22 enters the aircraft propulsion system 22 and its turbine engine 24 through an airflow inlet 88. This air is propelled by the rotating propulsor rotor 62 in a downstream, aft direction towards the propulsion system aft end 40.

An outer stream of the air propelled by the rotating propulsor rotor 62 is directed into the bypass flowpath 52 through its bypass inlet 58, which air entering the bypass flowpath 52 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 60 to provide forward thrust. The propulsion of the bypass air may account for a majority of the forward thrust generated by the aircraft propulsion system 22 and its turbine engine 24 of FIG. 1.

An inner stream of the air propelled by the rotating propulsor rotor 62 is directed into the core flowpath 50 through its core inlet 54, which air entering the core flowpath 50 may be referred to as "core air". This core air is compressed by the LPC rotor 63 and the HPC rotor 64 and is directed into a combustion chamber 90 (e.g., annular combustion chamber) of a combustor 92 (e.g., annular combustor) in the combustor section 44. Fuel is injected into the combustion chamber 90 by one or more fuel injectors 94 and mixed with the compressed core air to provide a fuel-air mixture. This fuel-air mixture is ignited and combustion products thereof flow through and sequentially drive rotation of the HPT rotor 65 and the LPT rotor 66. The rotation of the HPT rotor 65 and the LPT rotor 66 respectively drive rotation of the HPC rotor 64 and the LPC rotor 63 and, thus, compression of the air received from the core inlet 54. The rotation of the LPT rotor 66 also drives rotation of the propulsor rotor 62 through the propulsor drivetrain 74.

Figure 2:
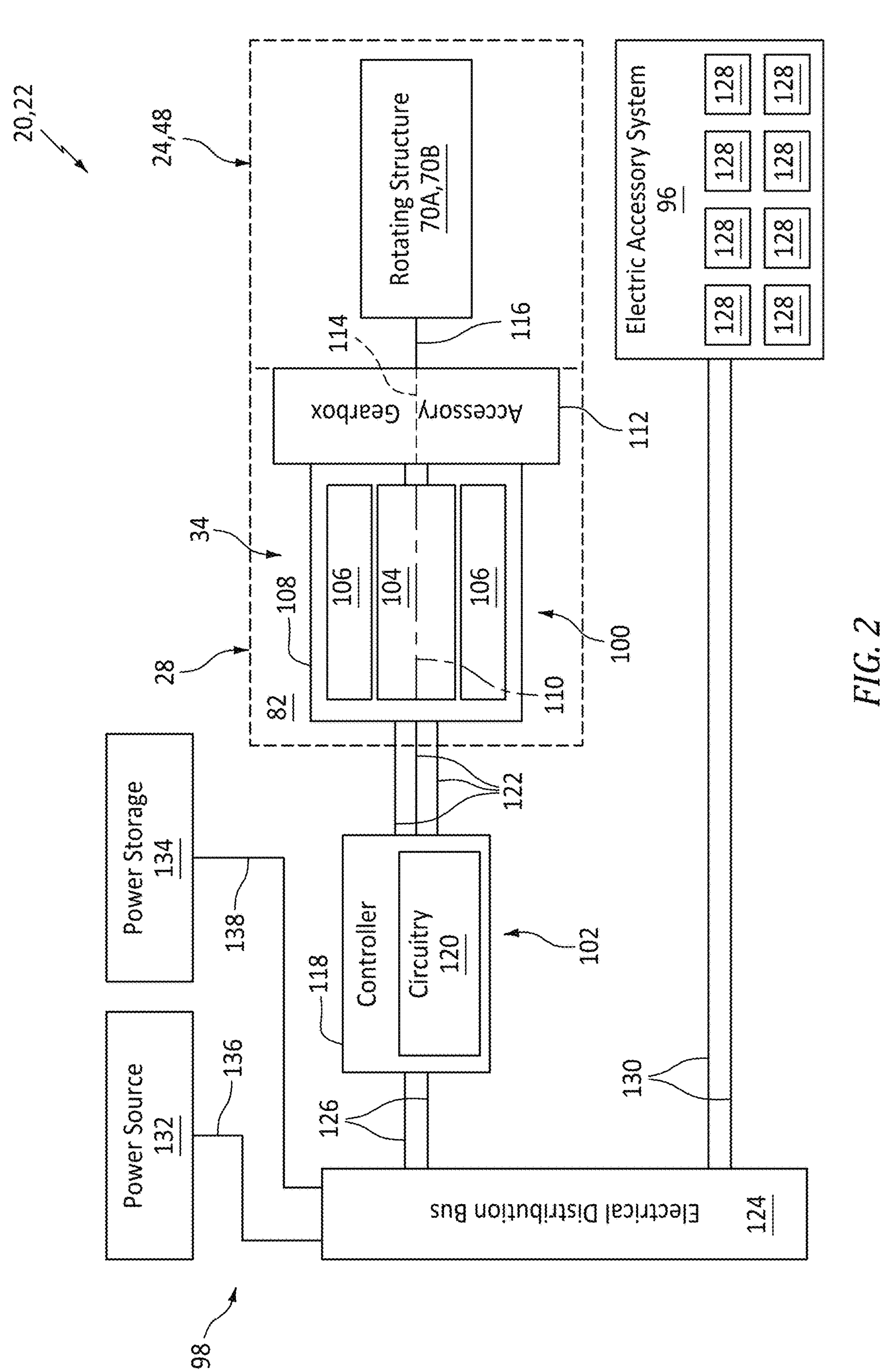
FIG. 2 is a schematic illustration of a portion of the aircraft propulsion system with an electric machine system.

Referring to FIG. 2, the electric machine system 34 is electrically coupled to an optional electric accessory system 96 and an electrical system 98 for the aircraft and its aircraft propulsion system 22. The electric machine system 34 of FIG. 2 includes at least (or only) one electric machine 100 and at least (or only) one electric machine (EM) controller 102 for the electric machine 100. For ease of description, the electric machine 100 of FIG. 2 is described below as being electrically coupled to, controlled by and/or otherwise associated with a single, dedicated EM controller. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with the single electric machine.

The electric machine 100 of FIG. 2 includes an electric machine rotor 104, an electric machine stator 106 and an electric machine housing 108; e.g., a case. The machine rotor 104 is rotatable about a rotational axis 110 of the machine rotor 104, which electric machine (EM) axis 110 may also be a centerline axis of the electric machine 100. The machine stator 106 of FIG. 2 is radially outboard of and circumscribes the machine rotor 104. With this arrangement, the electric machine 100 is configured as a radial flux electric machine. The electric machine 100 of the present disclosure, however, is not limited to such an exemplary rotor-stator configuration nor to radial flux arrangements. The machine rotor 104, for example, may alternatively be radially outboard of and circumscribe the machine stator 106. In another example, the machine rotor 104 may be axially next to the machine stator 106 configuring the electric machine 100 as an axial flux electric machine. Referring again to FIG. 2, the machine rotor 104 and the machine stator 106 are at least partially or completely housed within an interior of the machine housing 108.

Figure 3:
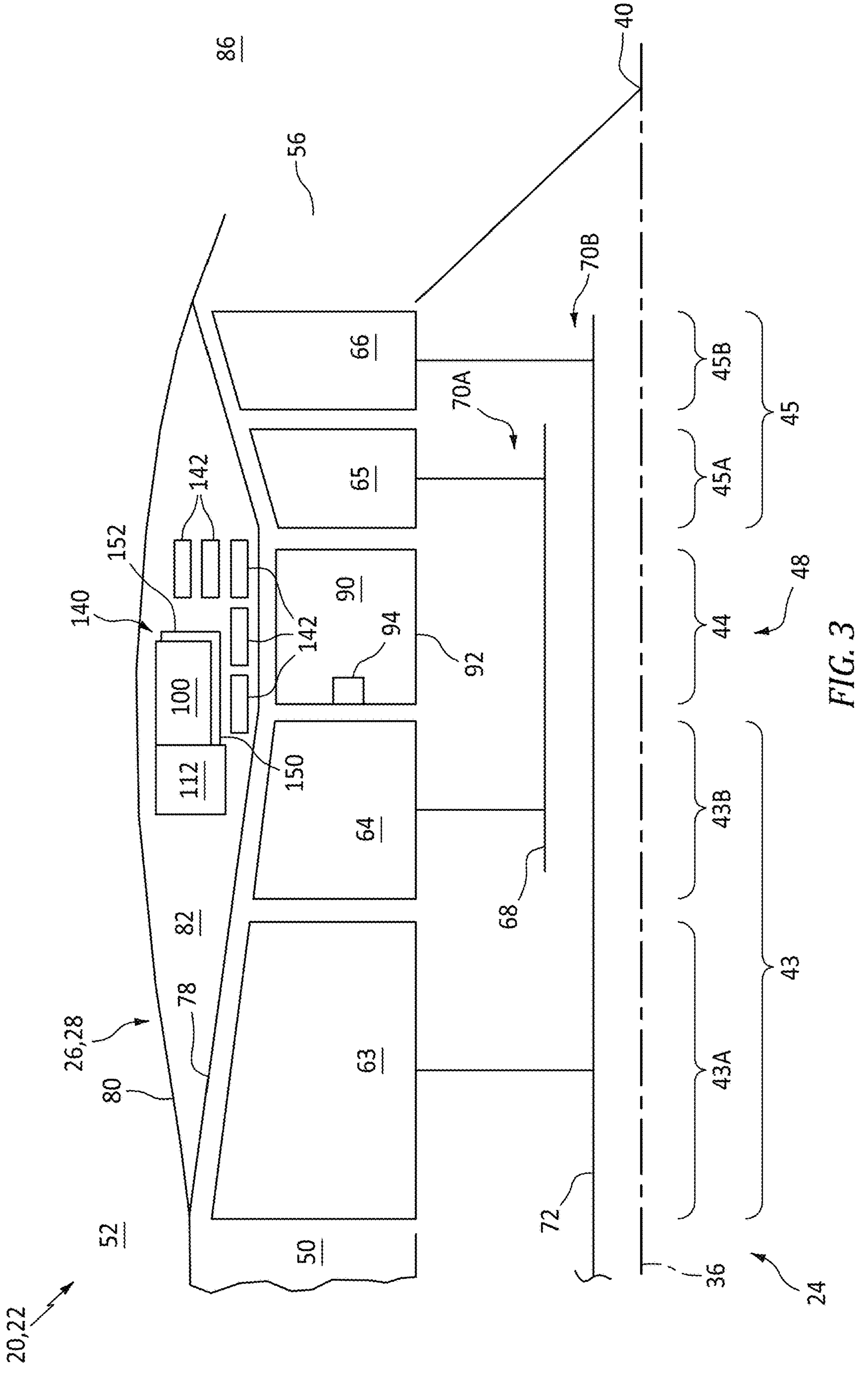
FIG. 3 is another schematic illustration of a portion of the aircraft propulsion system with the electric machine system.

The electric machine 100 may be mounted to a stationary component of the aircraft propulsion system 22. The electric machine 100 of FIG. 2, for example, is mounted to a gearbox 112 (e.g., an accessory gearbox) for the turbine engine 24. This gearbox 112 may be disposed within the inner housing compartment 82. The gearbox 112 of FIG. 3, for example, is located radially outboard of and next to the inner case 78, and the gearbox 112 may also be mounted to the inner case 78 (see also FIG. 1). The electric machine 100 of FIG. 3 is thereby disposed within the inner housing compartment 82 and mounted with the inner housing structure 28 and its inner case 78; e.g., at least indirectly mounted to the inner case 78 through the gearbox 112.

Referring to FIG. 2, the electric machine 100 is operatively coupled to a respective one of the engine rotating structures 70A, 70B (generally referred to as "70") (see also FIG. 1) through the gearbox 112. The machine rotor 104 of FIG. 2, for example, is mechanically coupled to a gear system 114 within the gearbox 112, and the gearbox gear system 114 is mechanically coupled to the respective engine rotating structure 70 through an engine-to-electric machine drivetrain 116. This engine-to-electric machine drivetrain 116 may be configured as or otherwise include a shaft, a tower shaft assembly, another gearbox (e.g., an angle gearbox), and/or the like. The present disclosure, however, is not limited to such an exemplary operative coupling between the electric machine 100 and the turbine engine 24 and its respective engine rotating structure 70.

The electric machine 100 of FIG. 2 may be configurable as an electric motor and/or an electric generator; e.g., an electric motor-generator. For example, during a motor mode of operation, the electric machine 100 may operate as the electric motor to convert electricity received from the aircraft electrical system 98 into mechanical power. The machine stator 106, for example, may generate an electromagnetic field with the machine rotor 104 using a current of electricity received from the aircraft electrical system 98 through the EM controller 102. This electromagnetic field may drive rotation of the machine rotor 104. The machine rotor 104, in turn, may provide mechanical power to and drive rotation of the respective engine rotating structure 70 through the gearbox 112 and the engine-to-electric machine drivetrain 116. This mechanical power may be provided to boost power or completely power the rotation of the respective engine rotating structure 70. By contrast, during a generator mode of operation, the electric machine 100 may operate as the electric generator to convert mechanical power received from the respective engine rotating structure 70 into electricity. Rotation of the machine rotor 104, for example, may be rotationally driven by rotation of the respective engine rotating structure 70 through the engine-to-electric machine drivetrain 116 and the gearbox 112. The rotation of the machine rotor 104 may generate an electromagnetic field with the machine stator 106, and the machine stator 106 may convert energy from the electromagnetic field into electricity. The electric machine 100 may then provide a current of electricity to the aircraft electrical system 98 through the EM controller 102 for storage and/or further use. The electric machine 100 of the present disclosure, however, is not limited to such exemplary operation. For example, the electric machine 100 may alternatively be configured as a dedicated electric generator; e.g., without the electric motor functionality. In another example, the electric machine 100 may alternatively be configured as a dedicated electric motor; e.g., without the electric generator functionality.

The EM controller 102 includes a controller housing 118 and internal controller circuitry 120. The controller housing 118 may be configured as an enclosed case (e.g., a closed or sealed container) for the controller circuitry 120. The controller circuitry 120 is disposed within an interior of the controller housing 118; e.g., an internal chamber or other volume(s) within and enclosed by the controller housing 118. The controller circuitry 120 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer (s), electrical rectifier(s), and/or the like.

The EM controller 102 is electrically coupled to the electric machine 100 through one or more electric cables 122; e.g., high voltage electric cables, power feeder cables, etc. More particularly, the controller circuitry 120 of the EM controller 102 is electrically coupled to the electric machine 100 and its machine stator 106 through the electric cables 122. Similarly, the EM controller 102 is electrically coupled to an electrical distribution bus 124 of the aircraft electrical system 98 through one or more electric cables 126; e.g., high voltage electric cables, power feeder cables, etc. More particularly, the controller circuitry 120 of the EM controller 102 is electrically coupled to the aircraft electrical system 98 and its electrical distribution bus 124 through the electric cables 126.

The EM controller 102 and its controller circuitry 120 are configured to control operation of the electric machine 100. For example, when operating as the electric motor, the EM controller 102 and its controller circuitry 120 are configured to regulate a flow of electricity from the aircraft electrical system 98 to the electric machine 100. This electricity flow regulation may include: (a) turning-on the flow of electricity from the aircraft electrical system 98 to the electric machine 100 (e.g., electrically coupling the electric machine 100 to the aircraft electrical system 98); (b) turning-off the flow of electricity from the aircraft electrical system 98 to the electric machine 100 (e.g., electrically decoupling the electric machine 100 from the aircraft electrical system 98); (c) moderating the flow of electricity from the aircraft electrical system 98 to the electric machine 100. Here, the EM controller 102 operates as a motor controller. In another example, when operating as the electric generator, the EM controller 102 and its controller circuitry 120 are configured to regulate a flow of electricity from the electric machine 100 to the aircraft electrical system 98. This electricity flow regulation may include: (a) turning-on the flow of electricity from the electric machine 100 to the aircraft electrical system 98 (e.g., electrically coupling the electric machine 100 to the aircraft electrical system 98); (b) turning-off the flow of electricity from the electric machine 100 to the aircraft electrical system 98 (e.g., electrically decoupling the electric machine 100 from the aircraft electrical system 98); (c) moderating the flow of electricity from the electric machine 100 to the aircraft electrical system 98. Here, the EM controller 102 operates as a generator controller.

The electric accessory system 96 includes one or more electric devices 128. The electric devices 128 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 128 of FIG. 2 may be configured as part of one or more sub-systems for the aircraft propulsion system 22 and its turbine engine 24. Examples of these sub-systems include, but are not limited to: a fuel system for delivering the fuel to the fuel injectors 94 (see FIG. 1); a lubrication system for delivering lubricant (e.g., oil) to one or more lubricated components (e.g., bearing(s), gear system (s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices.

Each electric device 128 is electrically coupled to the electrical distribution bus 124 of the aircraft electrical system 98 through one or more electric cables 130 (collectively schematically shown); e.g., high voltage electric cables, low voltage electric cables, power feeder cables, etc. Each electric device 128 may thereby receive a current of electricity from the aircraft electrical system 98 to power operation thereof.

The aircraft electrical system 98 includes the electrical distribution bus 124. This aircraft electrical system 98 may also include a power source 132 and/or a power storage 134. The electrical distribution bus 124 is electrically coupled to the electric machine 100 through its EM controller 102. The electrical distribution bus 124 is electrically coupled to each of the electric devices 128. The electrical distribution bus 124 is also electrically coupled to the power source 132 and the power storage 134, respectively schematically shown via lines 136 and 138. With this arrangement, the electrical distribution bus 124 provides an intermediate connection between the various electrical aircraft propulsion system members 100 (via 102), 128, 132 and/or 134. The power source 132 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 134 is configured to receive electricity from the electrical distribution bus 124 for storage. The power storage 134 is also configured to provide the stored electricity to the electrical distribution bus 124. The power storage 134, for example, may be configured as or otherwise include one or more electricity storage devices; e.g., batteries, super capacitors, etc. With the foregoing aircraft electrical system arrangement, the electrical current provided to one, some or all of the electric devices 128 may be received, through the electrical distribution bus 124, from any one, some or all of the electrical aircraft propulsion system members 100, 132 and/or 134.

Referring to FIG. 3, the electric machine 100 is arranged with an electric machine (EM) shield 140; e.g., a heat and/or electromagnetic wave shield. This EM shield 140 may be configured to shield the electric machine 100 and its internal electrical components from heat energy generated by and radiated and/or otherwise propagated out from the turbine engine 24 and its engine core 48 during turbine engine operation. The EM shield 140 may also (or alternatively) be configured to shield one or more components 142 of other sub-system(s) for the aircraft propulsion system 22 and its turbine engine 24 from electromagnetic interference and/or eddy current waves generated by the electric machine 100 during electric machine system operation. Such electromagnetic interference and/or eddy current waves may cause signal interference, generate heat and/or otherwise disturb sub-system operation. Examples of the shielded powerplant components 142 include, but are not limited to: one or more components of the fuel system (e.g., fuel conduits, fuel pump(s), fuel manifold(s), etc.); one or more components of the lubrication system (e.g., lubricant conduits, lubricant pump(s), lubricant manifold(s), etc.); one or more components of the aircraft electrical system 98 (e.g., electrical cable(s), etc.); and/or one or more components of another electrical system for the aircraft propulsion system 22 and its turbine engine 24 (e.g., electrical cable(s), sensor(s), actuator(s), controller(s), etc.).

Figure 4:
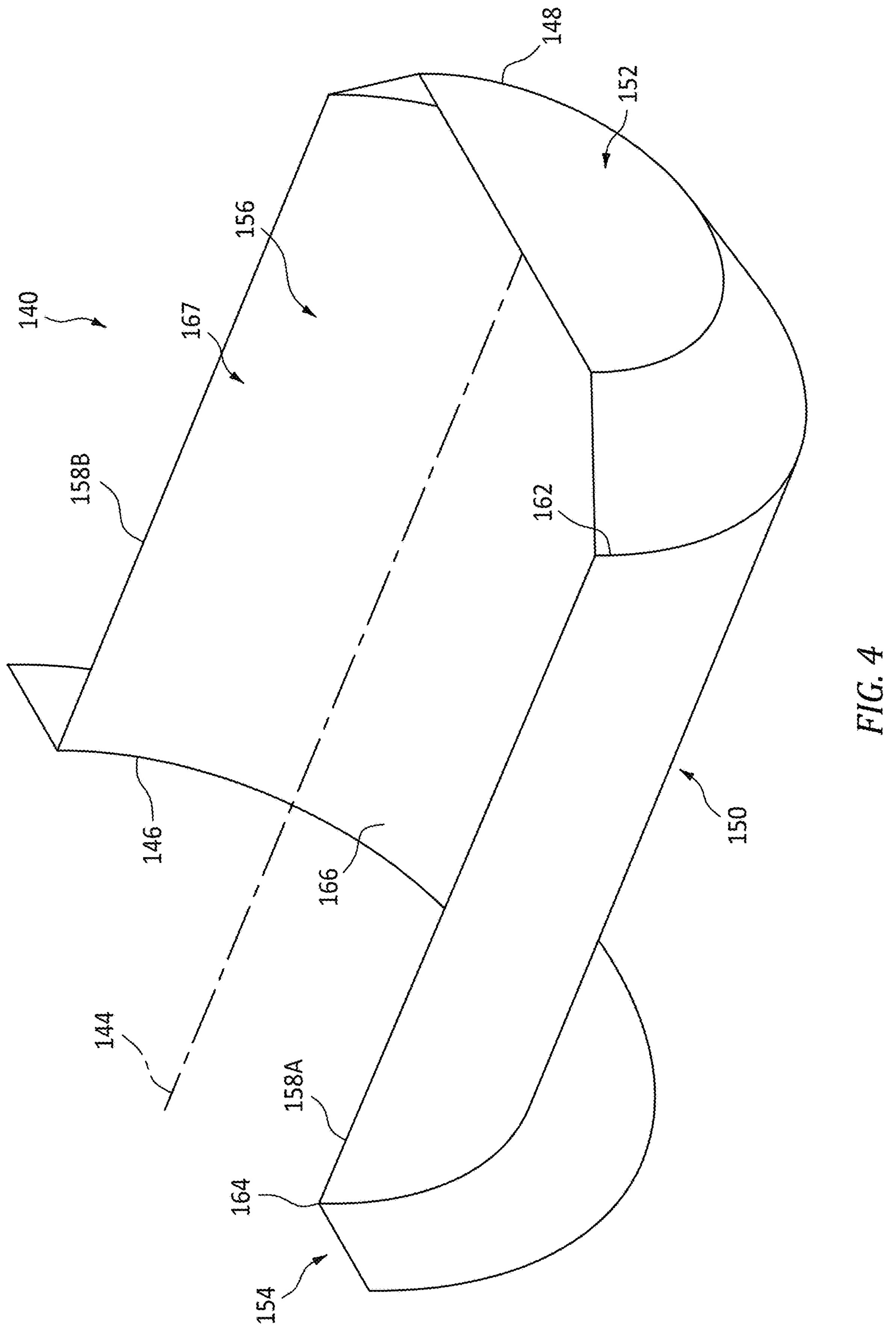
FIG. 4 is a perspective illustration of an electric machine shield.

Referring to FIG. 4, the EM shield 140 extends axially along a centerline axis 144 of the EM shield 140 from an axial first end 146 of the EM shield 140 to an axial second end 148 of the EM shield 140, which shield axis 144 may be parallel (e.g., coaxial) with the EM axis 110. The EM shield 140 is configured as an electromagnetic shield. In some examples, the EM shield 140 may additionally be configured as a heat shield, firewall, and/or the like. The EM shield 140 of FIG. 4 includes a channeled shield sidewall 150, a (e.g., cupped) shield endwall 152, a shield mount 154 and a shield channel 156.

The shield sidewall 150 extends axially along the shield axis 144 from (or about) the shield first end 146 to (or about) the shield second end 148. More particularly, the shield sidewall 150 of FIG. 4 extends axially along the shield axis 144 from the shield mount 154 located at the shield first end 146 to the shield endwall 152 located at the shield second end 148. The shield sidewall 150 extends circumferentially about (e.g., partially around) the shield axis 144 between opposing circumferential ends 158A and 158B (generally referred to as "158") of the EM shield 140 and its shield sidewall 150.

The shield endwall 152 is connected to (e.g., formed integral with and/or attached to) the shield sidewall 150. This shield endwall 152 projects radially outward from the shield axis 144 to a second end edge 162 of the shield sidewall 150.

The shield mount 154 is connected to (e.g., formed integral with and/or attached to) the shield sidewall 150. This shield mount 154 may be configured as a mounting flange. The shield mount 154 of FIG. 4, for example, projects radially outward from a first end edge 164 of the shield sidewall 150. The shield mount 154 of FIG. 4 also extends circumferentially about the shield sidewall 150 and the shield axis 144 between and to the opposing circumferential ends 158 of the EM shield 140.

The shield channel 156 projects axially along the shield axis 144 partially into the EM shield 140 from the shield first end 146, along an inner side 166 of the shield sidewall 150, to the shield endwall 152. The shield endwall 152 may thereby cap-off an axial end of the shield channel 156 at the shield second end 148. The shield channel 156 projects vertically (e.g., radially relative to the propulsion system axis 36 of FIG. 5) into the EM shield 140 from an opening 167 into the shield channel 156 at the opposing circumferential ends 158 of the EM shield 140 to the inner side 166 of the shield sidewall 150. The shield channel 156 also extends laterally (e.g., generally circumferentially relative to the propulsion system axis 36 of FIG. 5) within the EM shield 140 between opposing lateral sides of the shield sidewall 150 and its inner side 166. Though depicted as a section of a cylindrical shape, the present disclosure is not limited thereto and the EM shield 140 may be configured in any other shape and/or combination of shapes.

Figure 5:
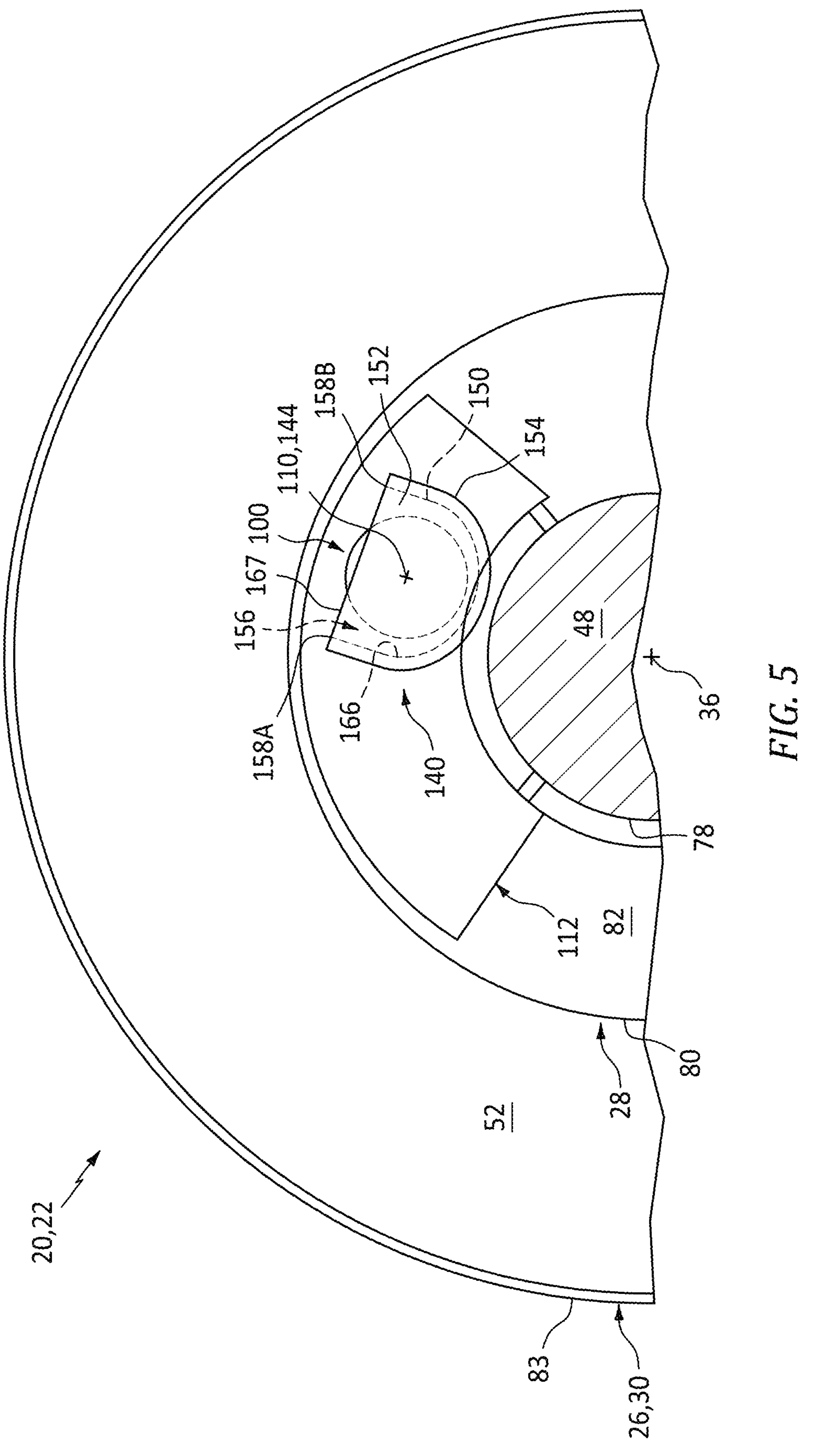
FIG. 5 is a schematic cross-sectional illustration of a portion of the aircraft propulsion system with the electric machine system.

Referring to FIG. 5, the EM shield 140 is mounted with the inner housing structure 28 and its inner case 78. The EM shield 140 of FIG. 5, for example, is mounted to an axial end of the gearbox 112, which gearbox 112 may be mounted to the inner case 78 as depicted and described above. More particularly, the shield mount 154 may be mechanically fastened (e.g., bolted) and/or otherwise attached to the gearbox 112. When mounted with the gearbox 112, the electric machine 100 is partially or completely disposed in the shield channel 156 and the shield sidewall 150 extends partially circumferentially about the electric machine 100. Here, the channel opening 167 faces radially (relative to the propulsion system axis 36) away from the turbine engine 24 and its members 48 and 78. The shield sidewall 150 is thereby disposed radially (relative to the propulsion system axis 36) between the electric machine 100 and the turbine engine 24 and its members 48 and 78. The shield sidewall 150 and/or the shield endwall 152 of FIG. 3 may also be disposed radially, axially and/or circumferentially (relative to the propulsion system axis 36) between the electric machine 100 and the shielded powerplant components 142.

Figures 6, 7A:
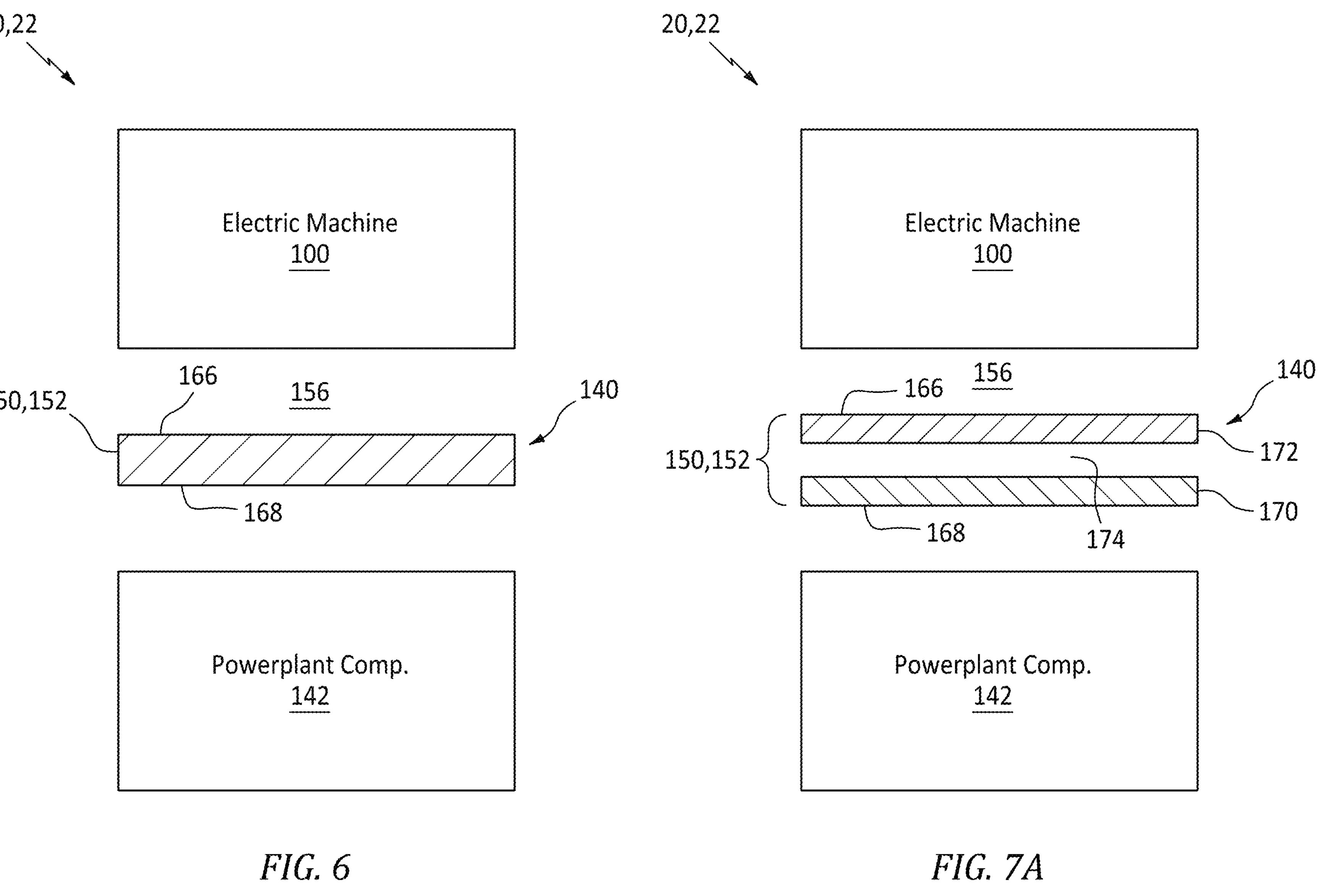
FIG. 6 is a schematic illustration of a shield wall with a single layer construction between an electric machine and a powerplant component.
FIGS. 7A-C are schematic illustrations of the shield wall with various multi-layer constructions between the electric machine and the powerplant component.

In some embodiments, referring to FIG. 6, one or more walls 150, 152 of the EM shield 140 may each be configured with a single layer construction. The shield wall 150, 152 of FIG. 6, for example, is formed by, or may otherwise include, a layer of shield material. The shield material may be selected based on various factors including an EMC noise frequency range to be attenuated. Here, this layer of shield material extends between and forms a portion of the shield channel 156 and a portion of an exterior 168 of the EM shield 140. Examples of this shield material include, but are not limited to, ferrous metal, non-ferrous metal, dielectric material, and high permeability material. Examples of the non-ferrous metal include, but are not limited to, aluminum (Al), copper (Cu), titanium (Ti) and/or an alloy thereof. A non-limiting example of the dielectric material is silicon carbide (SiC). The ferrous metals may include steel, stainless steel, alloy steel, carbon steel, titanium, and/or other ferrous metals. An example high permeability material is mu (u) metal, which mu metal may be manufactured using mixed powder metal with nickel, alloy, steel and etc. The shield wall may be connected to the engine structure with a bonding. In addition or alternatively, an additional bonding strap may connect the shield wall and the engine ground.

Figures 7B, 7C:
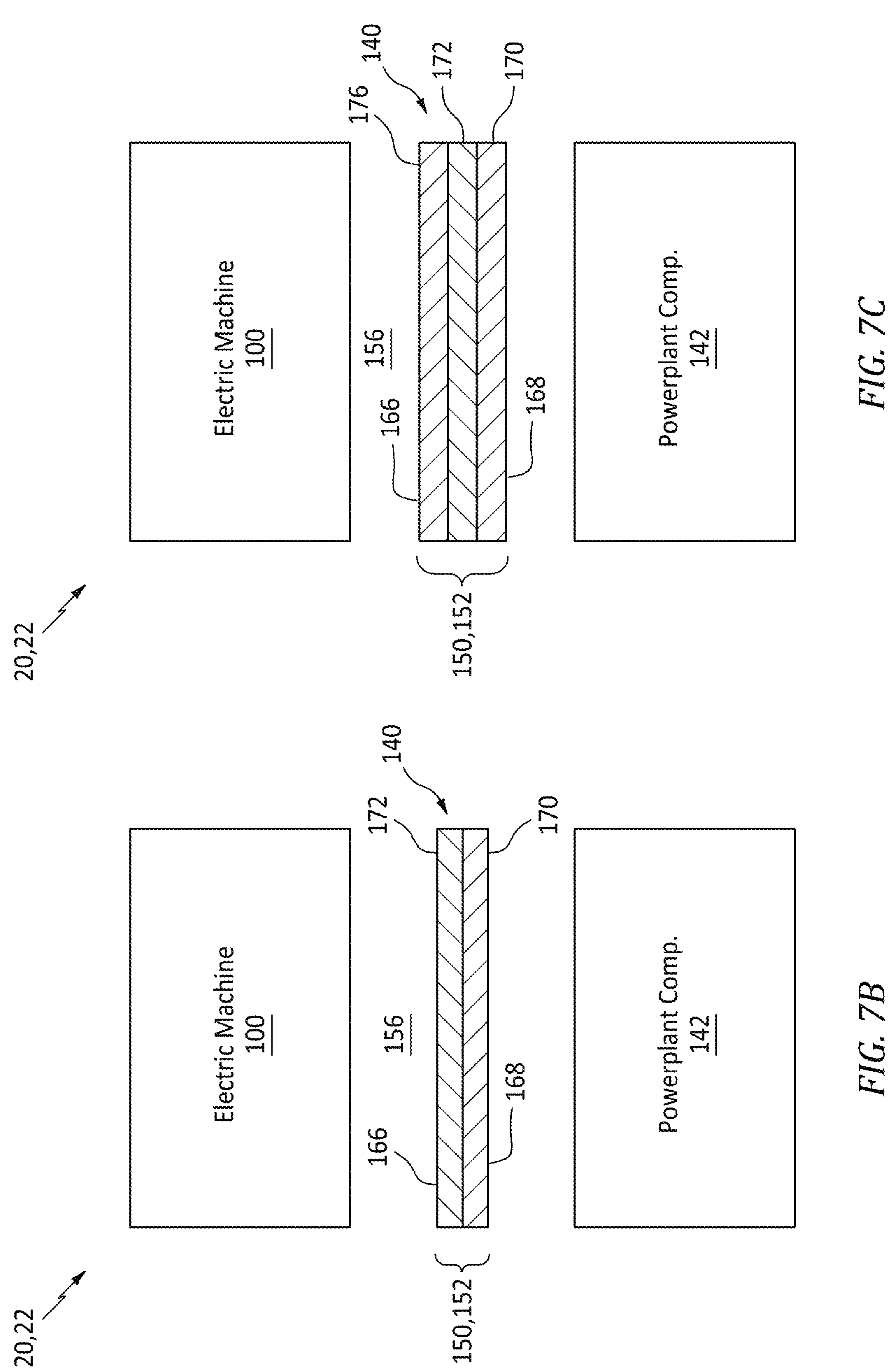

In some embodiments, referring to FIGS. 7A and 7B, one or more walls 150, 152 of the EM shield 140 may each be configured with a multi-layer construction. The shield wall 150, 152 of FIGS. 7A and 7B, for example, includes a first layer 170 and a second layer 172 that overlaps the first layer 170. Where the shield wall 150, 152 is the shield sidewall 150 of FIG. 4, the second layer 172 of FIGS. 7A and 7B may axially and circumferentially overlap the second layer 172. Where the shield wall 150, 152 is the shield endwall 152 of FIG. 4, the second layer 172 of FIGS. 7A and 7B may axially and radially overlap the second layer 172. Referring to FIG. 7A, along at least a portion or an entirety of the shield wall 150, 152, the second layer 172 may be spaced from the first layer 170 by an air gap 174. Referring to FIG. 7B, along at least a portion or the entirety of the shield wall 150, 152, the second layer 172 may alternatively engage (e.g., contact) and/or be attached (e.g., bonded) to the first layer 170. The first layer 170 may be formed by, or may otherwise include, a layer of the non-ferrous metal. The second layer 172 may be formed by, or may otherwise include, a layer of the dielectric material. The first layer 170 may be disposed between the powerplant component(s) 142 outside of the EM shield 140 and the second layer 172. The second layer 172 may be disposed between the first layer 170 and the electric machine 100. In other embodiments, referring to FIG. 7C, the respective shield sidewall 150 may also include a third layer 176 overlapping the second layer 172, with the second layer 172 between the first layer 170 and the third layer 176. This third layer 176 may also be formed by, or may otherwise include, a layer of the non-ferrous metal. With this arrangement of FIG. 7C, the dielectric material is sandwiched between and thermally protected by the non-ferrous metal. Note, while the second layer 172 of FIG. 7C is shown as engaging both the first layer 170 and the third layer 176, it is contemplated the second layer 172 may alternatively be spaced from the first layer 170 and/or the third layer 176 to provide an insulative air gap therebetween.

The aircraft propulsion system 22 of FIG. 1 is described above as a ducted propulsor propulsion system; e.g., the turbofan propulsion system. The present disclosure, however, is not limited to such an exemplary aircraft propulsion system. For example, referring to FIG. 8, the outer housing structure 30 (see FIG. 1) may be omitted from the propulsion system housing 26 to open the propulsor rotor 62 up to the external environment 86. More particularly, the propulsor rotor 62 of FIG. 8 includes a plurality of open propulsor blades 178 arranged circumferentially about the propulsion system axis 36 in an array; e.g., a circular array. This array of the propulsor blades 178 may be unshrouded or alternatively shrouded by a tubular propulsor rotor shroud dedicated to the propulsor rotor 62 for example. Each of these propulsor blades 178 projects spanwise (e.g., radially) out from a base of the propulsor rotor 62, into the external environment 86, to a distal tip 180 of the respective propulsor blade 178. Each propulsor blade 178 is thereby configured as an un-ducted propulsor blade which is exposed to (e.g., disposed in) the surrounding external environment 86. With this arrangement, the propulsor rotor 62 is an open propulsor rotor (e.g., an un-ducted propulsor rotor) and the aircraft propulsion system 22 is configured as an open rotor propulsion system. Moreover, the inner housing structure 28 and its nacelle structure 80 may form an exterior of the aircraft propulsion system 22 and may border the external environment 86.

The guide vane structure 32 may also be open to the external environment 86 forming an open guide vane structure. This guide vane structure 32 of FIG. 8 includes a plurality of open exit guide vanes 182; e.g., airfoils. The guide vanes 182 are arranged and may (or may not) be equispaced circumferentially about the propulsion system axis 36 in an array; e.g., a circular array. This array of the guide vanes 182 may be unshrouded or alternatively shrouded by a tubular guide vane shroud dedicated to the guide vane structure 32 for example. This guide vane structure 32 and its guide vanes 182 are arranged axially next to (e.g., adjacent) the propulsor rotor 62 and its propulsor blades 178. The guide vane structure 32 and its guide vanes 182 of FIG. 8, for example, are arranged downstream of the propulsor rotor 62 and its propulsor blades 178, without (e.g., any) other elements axially therebetween to obstruct, turn and/or otherwise influence the air propelled by the propulsor rotor 62 to the guide vane structure 32. Each of the guide vanes 182 projects radially out from an exterior surface of the inner housing structure 28, into the external environment 86, to a distal tip 184 of the respective guide vane 182. Each guide vane 182 is thereby configured as an un-ducted guide vane which is exposed to (e.g., disposed in) the surrounding external environment 86. With the foregoing arrangement, the guide vane structure 32 and its guide vanes 182 are configured to condition (e.g., straighten out, de-swirl, etc.) an outer stream of air propelled by the propulsor rotor 62 within the external environment 86 that bypass the engine core 48. Of course, in other embodiments, the guide vane structure 32 may be omitted where, for example, the aircraft propulsion system 22 is alternatively configured as a counter-rotating open rotor (CROR) aircraft propulsion system, etc.

Figure 8:
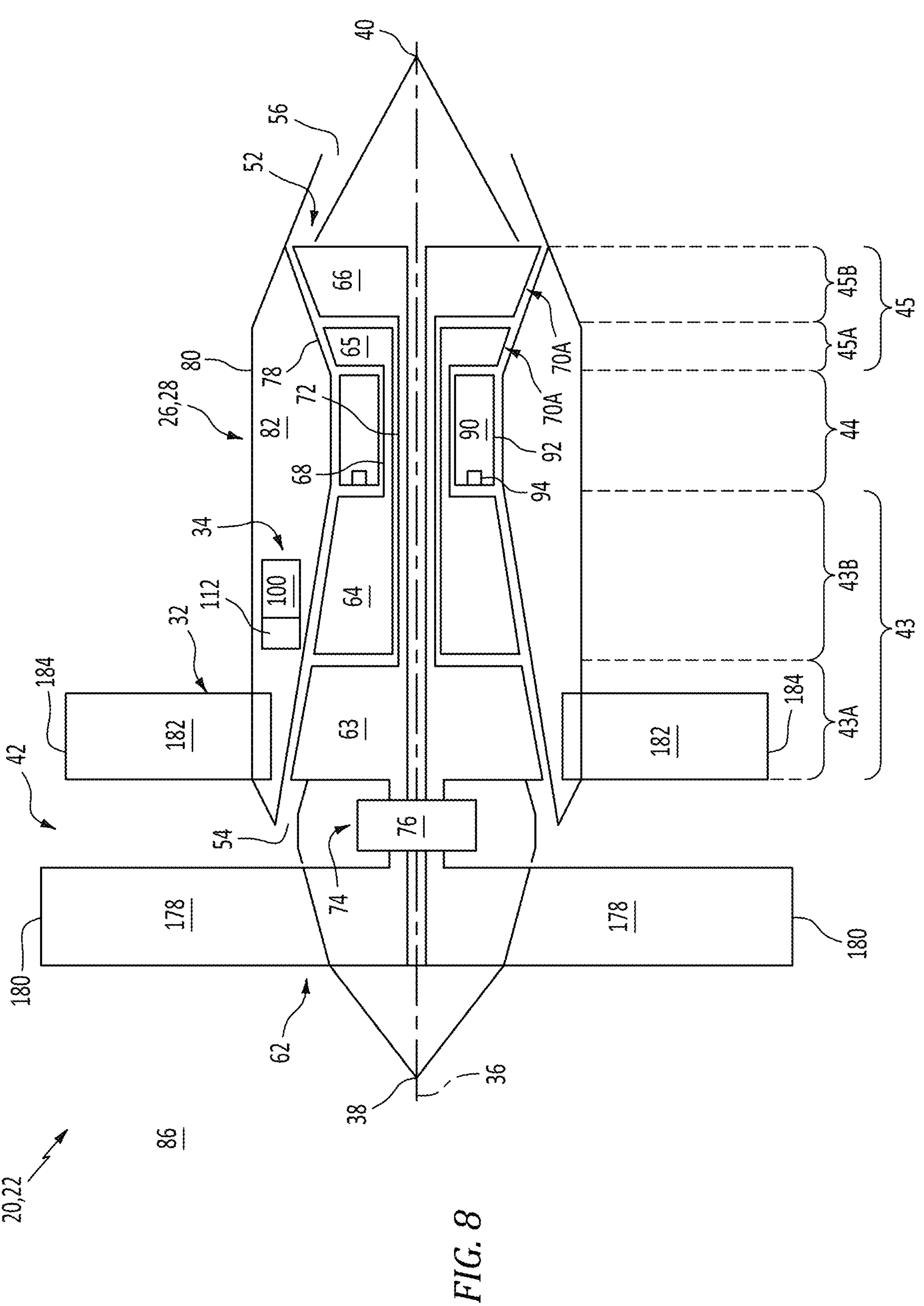
FIG. 8 is a partial schematic illustration of the aircraft propulsion system with an open propulsor rotor.

While the turbine engine 24 in FIG. 1 and FIG. 8 is shown with a particular two rotating structure arrangement, the present disclosure is not limited thereto. For example, the LPC rotor 63 may be omitted to configure the LPT rotor 66 as a power turbine (PT) rotor for the propulsor rotor 62. In another example, the turbine engine 24 may also include another rotating structure; e.g., an intermediate speed spool for the turbine engine 24 and its engine core 48.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:

an engine case;

an engine core housed within the engine case, the engine core comprising a compressor section, a combustor section and a turbine section;

an electric machine disposed outboard of and mounted with the engine case, the electric machine comprising an electric machine rotor, an electric machine stator and an electric machine case, the electric machine rotor housed within the electric machine case and rotatable about an axis, and the electric machine stator housed within the electric machine case and next to the electric machine rotor; and a shield disposed between the electric machine case and the engine case, the shield extending axially along and partially circumferentially about the electric machine, a wall of the shield comprising a first layer of non-ferrous metal and a second layer of dielectric material, the first layer facing the engine case and configured to shield the electric machine from heat energy, and the second layer facing the electric machine and configured to shield the engine core from electromagnetic energy, the wall comprises a sidewall and an endwall;

the sidewall extends axially along the electric machine to the endwall; and the sidewall extends partially circumferentially about the electric machine between opposing circumferential ends of the sidewall, thereby forming a channel about the electric machine.

2. The assembly of claim 1, wherein the heat energy is generated by the engine core.

3. The assembly of claim 1, further comprising:

a powerplant component;

the shield disposed between the electric machine and the powerplant component, and the shield configured to shield the powerplant component from electromagnetic energy generated by the electric machine.

4. The assembly of claim 3, wherein the powerplant component comprises one of a component of an electrical system;

a component of a lubrication system; or a component of a fuel system.

5. The assembly of claim 1, wherein the second layer axially and circumferentially overlaps the first layer.

6. The assembly of claim 1, wherein the second layer radially and circumferentially overlaps the first layer.

7. The assembly of claim 1, wherein the second layer engages and/or is attached to the first layer.

8. The assembly of claim 1, wherein the second layer is spaced from the first layer by an air gap.

9. The assembly of claim 1, wherein the wall of the shield further comprises a third layer overlapping the second layer;

the second layer is between the first layer and the third layer; and the third layer comprises a non-ferrous metal.

10. The assembly of claim 1, wherein the second layer is between the first layer and the electric machine.

11. The assembly of claim 1, wherein the electric machine is disposed in a channel of the shield; and an opening into the channel faces away from the engine core.

12. The assembly of claim 1, further comprising a rotating structure operatively coupled to the electric machine rotor, the rotating structure comprising a bladed rotor in the compressor section or the turbine section.

13. The assembly of claim 1, wherein the electric machine is configurable as at least one of an electric motor during a motor mode of operation; or an electric generator during a generator mode of operation.

14. The assembly of claim 1, further comprising:

a ducted propulsor rotor; and a rotating structure operatively coupled to and configured to drive rotation of the ducted propulsor rotor, the rotating structure comprising a turbine rotor disposed in the turbine section.

15. The assembly of claim 1, further comprising:

an open propulsor rotor; and a rotating structure operatively coupled to and configured to drive rotation of the open propulsor rotor, the rotating structure comprising a turbine rotor disposed in the turbine section.

16. An assembly for an aircraft propulsion system, comprising:

a housing structure including an inner housing structure and an outer housing structure that is disposed radially outboard of the inner housing structure, the inner housing structure including an engine case and a nacelle structure that at least partially covers the engine case;

a propulsor rotor housed within the outer housing structure;

an engine core configured to drive rotation of the propulsor rotor, the engine core housed within the engine case, and the engine core including a compressor section, a combustor section and a turbine section;

an electric machine disposed in a compartment between the engine case and the nacelle structure; and a shield comprising a first layer and a second layer and disposed between the electric machine and the engine case, the first layer of the shield configured to shield the electric machine from heat energy generated by the engine core; and the second layer of the shield configured to shield a powerplant component mounted with the engine case from electromagnetic energy generated by the electric machine, the shield further comprising a sidewall and an endwall;

the sidewall extends axially along the electric machine to the endwall; and the sidewall extends partially circumferentially about the electric machine between opposing circumferential ends of the sidewall, thereby forming a channel about the electric machine.

17. An assembly for an aircraft powerplant, comprising:

a gearbox;

an electric machine mounted to and operably coupled to the gearbox, the electric machine is configurable as at least one of an electric motor during a motor mode of operation; or an electric generator during a generator mode of operation; and a shield including a sidewall and an endwall, the sidewall extending partially circumferentially about the electric machine between opposing sides of an opening into the shield, the sidewall extending axially along the electric machine to the endwall, the sidewall and the endwall forming a channel in which the electric machine is disposed, and the shield constructed from at least one of non-ferrous metal or dielectric material.

* * * * *